(12) United States Patent
Joffe

(10) Patent No.: US 6,757,383 B1
(45) Date of Patent: Jun. 29, 2004

(54) COMPACT CABLE BALANCE NETWORK FOR ECHO-CANCELLING, AND METHOD FOR OPTIMIZING TRANSHYBRID LOSS AND METHOD AND APPARATUS FOR CIRCUIT SIMULATION

(75) Inventor: Daniel M Joffe, Owens Crossroads, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/222,387

(22) Filed: Dec. 29, 1998

(51) Int. Cl.$^7$ ................................................. H04M 9/08
(52) U.S. Cl. .................... 379/406.01; 379/398; 379/402
(58) Field of Search .......................... 379/406.01, 402, 379/403, 345, 404, 398, 414; 370/32, 282, 286

(56) References Cited

U.S. PATENT DOCUMENTS

| | | | | |
|---|---|---|---|---|
| 3,848,098 A | * | 11/1974 | Pinel | 379/402 |
| 5,249,145 A | * | 9/1993 | Kakuishi | 708/317 |
| 5,282,157 A | * | 1/1994 | Murphy et al. | 703/4 |
| 6,111,861 A | * | 8/2000 | Burgess | 370/286 |
| 6,298,046 B1 | * | 10/2001 | Thiele | 370/282 |

OTHER PUBLICATIONS

Perkins, Phil, "Analog Circuit Design, Art Science and Personalities", Edited by Jim Williams, Butterworth–Heinemann, Chapter 22, (1991), pps. 211–212.

Alan V. Oppenheim and Alan S. Willsky, Signals and Systems, Prentice–Hall, Inc. (1983) pps. 41–42.

Newton's Telecom Dictionary, CMP Books,p. 96, (2003).

* cited by examiner

Primary Examiner—Minsun Oh Harvey
Assistant Examiner—Con P. Tran
(74) Attorney, Agent, or Firm—Thomas, Kayden, Horstemeyer & Risley, L.L.P.

(57) ABSTRACT

A cable balance network for use in a full-duplex telecommunication system and method for optimizing the transhybrid loss of a full-duplex to half-duplex conversion circuit, said cable balance network comprising: (a) a plurality n of resistors $R_n$, each of said resistors $R_n$ having a fixed resistance value dependent upon the impedance seen by the full-duplex port, and each of said resistors $R_n$, having a positive node and a negative node; (b) a plurality n-1 of capacitors $C_{n-1}$, each of said capacitors $C_{n-1}$ having a fixed capacitance value dependent upon the impedance seen by said full-duplex port, and each of said capacitors $C_{n-1}$ having a positive node and a negative node; and (c) a circuit configuration comprising at least two of said resistors $R_1$, and $R_2$ ($n \geq 2$) and at least one of said capacitors $C_1$, such that all the negative nodes of each of said resistors $R_n$ are effectively connected together, and such that the capacitor $C_{n-1}$ is connected between the positive nodes of resistors $R_n$ and $R_{n-1}$ for all values of n; the combination being constructed and arranged such that said circuit configuration, resistance values, and capacitance values define an optimized cable balance network input impedance and an optimized transhybrid loss for said conversion circuit. The invention is particularly useful in the design and simulation of telecommunication systems and echo cancelers.

35 Claims, 5 Drawing Sheets

COMPACT CABLE BALANCE NETWORK FOR ECHO-CANCELLING, AND METHOD FOR OPTIMIZING TRANSHYBRID LOSS AND METHOD AND APPARATUS FOR CIRCUIT SIMULATION

SPECIFICATION

A portion of the disclosure of this patent document contains material which is subject to copyright protection. The copyright owner has no objection to the facsimile reproduction by anyone of any portion of the patent document, as it appears in any patent granted from the present application or in the Patent and Trademark Office file or records available to the public, but otherwise reserves all copyright rights whatsoever.

An appendix containing source code listing and related materials utilized in practicing an exemplary embodiment of the invention is included as part of the Specification and is hereinafter referred to as Appendix A.

BACKGROUND OF INVENTION

The present invention relates to a resistance-capacitance (R-C) balancing network for a hybrid for use in a full-duplex telecommunication system, to a method for optimizing transhybrid loss, and to methods and apparatus for synthesizing impedances and simulating telecommunications circuits. The invention is particularly useful in the design, operation, and simulation of echo cancelers used in telecommunication systems.

Full duplex two wire telecommunications systems use a single wire-pair to transmit and receive data. The transmitted and received data often have overlapping spectra or frequency bands. As such, it is necessary to separate transmitted and received signals to facilitate the full duplex data transfer. A technique used to achieve this separation is known as echo cancellation. The echo cancellation function can be performed by a full-duplex to half-duplex conversion circuit, for example, a two-wire ("2W") to four-wire ("4W") converter, or hybrid.

Once the transmit and receive directions of transmission have been separated, they can be transmitted over facilities on independent half-duplex paths. The independent half-duplex paths are known as a four-wire facility.

Communications systems can use a combination of digital and analog echo cancelling techniques. One embodiment of the present invention concentrates on analog techniques, but does not preclude the adaptation of those techniques to digital forms as is readily understood by those of skill in the art.

The task of an echo canceller is to cancel the near-end signal sufficiently well so that the far end signal can be detected at the near-end. This task is often especially challenging as the far end signal has undergone significant attenuation in the intervening cable which connects near and far ends.

Performance of the echo cancellation task requires, in some form, knowledge of the impedance seen looking into the cable pair. In accordance with the invention, I describe simple networks which accurately model this impedance, as well as methods for designing those networks.

When these networks are used in hybrids, they are often referred to as balancing networks. When used in other echo cancelling structures, these networks may have other names, but their function is still similar, i.e., to aid the cancellation of near end signal at the near end, while maximizing the amount of far end signal received at the near end.

In systems using a balancing network, the quality of the impedance match between the balancing network and the local loop is measured by the transhybrid loss of the conversion circuit, e.g., a hybrid, which loss is a measure of the effectiveness of the network. Transhybrid loss ("THL") is typically expressed in decibels ("dB") by equation (1):

$$THL = 20 \log \left| \frac{V_C}{V_C^B} \right| \quad (1)$$

where $V_c$ is the signal at the "C" port of the conversion circuit to be transmitted to the full-duplex port, e.g., a hybrid, (FIG. 1A), and $V_C^B$ is the component of $V_c$ appearing at the "B" port of the hybrid.

The quality of the impedance match between the balancing network and the local loop can also be measured by the return loss of the network. A low return loss indicates a poor impedance match or mismatch between the balancing network and the local loop. A network with a low return loss thus will suffer from more uncancelled near-end signal at the near end.

In most hybrid structures, good return loss between the balancing network and the local loop will result in good transhybrid loss. THL is the most important measure of a hybrid or echo canceller's attenuation of near-end echo. Note that in some echo canceller realizations, impedances can be scaled so that the return loss between the balancing network and the cable will be small, but the THL will still be high.

Previous balancing networks for full-duplex telecommunication systems offered good transhybrid loss in the voice frequency band, but only fair transhybrid loss over the wider band of frequencies used for high bit-rate digital communications systems. Typical passive balance networks have been limited to two basic designs: simple R-C circuits and complex R-L-C circuits. Simple R-C designs have been limited in accuracy and in frequency response, while conventional R-L-C designs have proven to be more expensive, bulkier, and harder to integrate as compared to conventional R-C designs.

Because of the shortcomings of prior art cable balance networks, the need often arises for a simple and accurate representation of a cable's input impedance. This is true especially in areas of telecommunication systems and echo canceller design and simulation. For example, cable balance networks utilizing complete multi-section resistance-inductance-conductance-capacitance (R-L-G-C) designs require too many discrete components and are extremely expensive to produce and manufacture because of the inductance requirement. Similarly, in the area of computer simulation, mathematical models of circuits based on the use of complex damped exponentials and R-L-G-C look-up tables require special programming and are computationally intensive and not readily adaptable to circuit simulators for use in computing the impedance of local loop cables.

Therefore, the need for simple and accurate balancing networks is especially critical when synthesizing or simulating communication system circuits using different wire gauges and cable lengths, or when tailoring an existing communication system for use in different frequency bands.

It is, therefore, a principal object of the present invention to provide a simple cable balancing network for a full-duplex telecommunication system that provides accurate cable input impedance modeling over a desired frequency range.

It is another object of the present invention to provide a simple, yet high performance cable balancing network for a full-duplex telecommunication system, where the improvement in transhybrid loss reduces the computational requirements and costs of an associated digital echo canceler.

It is yet another objective of the present invention to provide a method for optimizing the transhybrid loss provided for a full-duplex to half-duplex conversion circuit by a cable balance network.

It is still another object of the present invention to provide a method for synthesizing complex impedances and simulating useful telecommunications circuits by relatively simple circuit models thereof.

SUMMARY OF THE INVENTION

In accordance with the present invention, a cable balance network for echo cancelling in a full-duplex telecommunication system incorporating a full-duplex port, at least one half-duplex port, and a full-duplex to half-duplex conversion circuit, comprises: (a) a first plurality n of resistors $R_n$, each of said resistors $R_n$ having a fixed resistance value dependent upon the impedance connected to the full-duplex port and each of said resistors $R_n$ having a positive node and a negative node; (b) a second plurality n−1 of capacitors $C_{n-1}$, each of the capacitors $C_{n-1}$ having a fixed capacitance value dependent upon the impedance connected to the full-duplex port and each of the capacitors $C_{n-1}$ having a positive node and a negative node; and (c) a circuit configuration comprising at least two of the resistors and at least one of the capacitors such that all the negative nodes of each of the resistors are effectively connected together, and such that the capacitor is connected between the positive nodes of the at least two resistors for all values of n; the combination being so constructed and arranged that the circuit configuration, resistance values, and capacitance values define the cable balance network input impedance and an optimized transhybrid loss for the conversion circuit.

In further accordance with the present invention, a cable balance network for a full-duplex telecommunication system incorporating a full-duplex port, at least one half-duplex port, and a full-duplex to half-duplex conversion circuit, comprises: (a) four resistors $R_1$, $R_2$, $R_3$, and $R_4$, each of the resistors having a fixed resistance value dependent upon the impedance connected to the full-duplex port and each of the resistors having a positive node and a negative node; (b) three capacitors $C_1$, $C_2$, and $C_3$, each of the capacitors having a fixed capacitance value dependent upon the impedance connected to the full-duplex port and each of the capacitors having a positive node and a negative node; and (c) a circuit configuration comprising the resistors and the capacitors, such that all of the negative nodes of the resistors are effectively connected together and such that the capacitor $C_1$ is connected between the positive nodes of resistors $R_1$ and $R_2$, the capacitor $C_2$ is connected between the positive nodes of resistors $R_2$ and $R_3$, and the capacitor $C_3$ is connected between the positive nodes of resistors $R_3$ and $R_4$; the combination being so constructed and arranged that the circuit configuration, resistance values, and capacitance values define the cable balance network input impedance and an optimized transhybrid loss for the conversion circuit.

In further accordance with the present invention, a cable balance network for a full-duplex telecommunication system incorporating a full-duplex port, at least one half-duplex port, and a full-duplex to half-duplex conversion circuit, the cable balance network comprises: (a) five resistors $R_1$, $R_2$, $R_3$, $R_4$, and $R_5$, each of the resistors having a fixed resistance value dependent upon the impedance connected to the full-duplex port and each of the resistors having a positive node and a negative node; (b) four capacitors $C_1$, $C_2$, $C_3$, and $C_4$, each of the capacitors having a fixed capacitance value dependent upon the impedance connected to the full-duplex port and each of the capacitors having a positive node and a negative node; and (c) a circuit configuration comprising the resistors and the capacitors, such that all of the negative nodes of each of the resistors are effectively connected together and such that the capacitor $C_1$ is connected between the positive nodes of resistors $R_1$ and $R_2$, the capacitor $C_2$ is connected between the positive nodes of resistors $R_2$ and $R_3$, the capacitor $C_3$ is connected between the positive nodes of resistors $R_3$ and $R_4$, and the capacitor $C_4$ is connected between the positive nodes of resistors $R_4$ and $R_5$; the combination being so constructed and arranged that the circuit configuration, resistance values, and capacitance values define the cable balance network input impedance and an optimized transhybrid loss for the conversion circuit.

In further accordance with the present invention there is provided with respect to a cable balance network for a full-duplex telecommunication system incorporating a full duplex port, at least one half-duplex port, and a full-duplex to half-duplex conversion circuit, a method for synthesizing an R-C cable balance network by selecting resistance and capacitance values for each of the resistors and the capacitors in the balance network so as to optimize the input impedance match and transhybrid loss of the cable balance network, the method comprising the steps of: (a) characterizing the input impedance of the full-duplex port over a selected frequency range; (b) selecting as a resistance value of the network input resistor $R_1$ the impedance connected to the full-duplex port at DC; (c) selecting as the resistance values of the remaining resistors in the network such that the resistance of the parallel combination of the resistors equals the impedance connected to the full-duplex port at high frequencies; and (d) optimizing the resistance and capacitance values to optimize the transhybrid loss for the conversion circuit.

DETAILED DESCRIPTION OF THE INVENTION

Figure 1A:
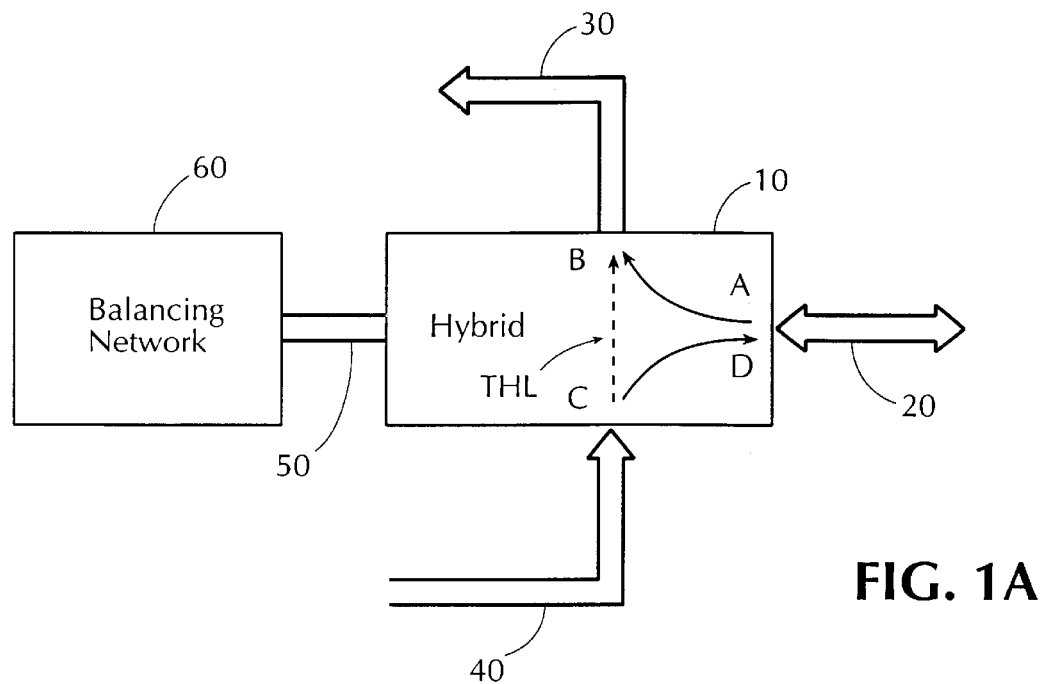
FIGS. 1A and 1B illustrate the configuration of a conversion circuit and associated balancing network.
Figure 1B:
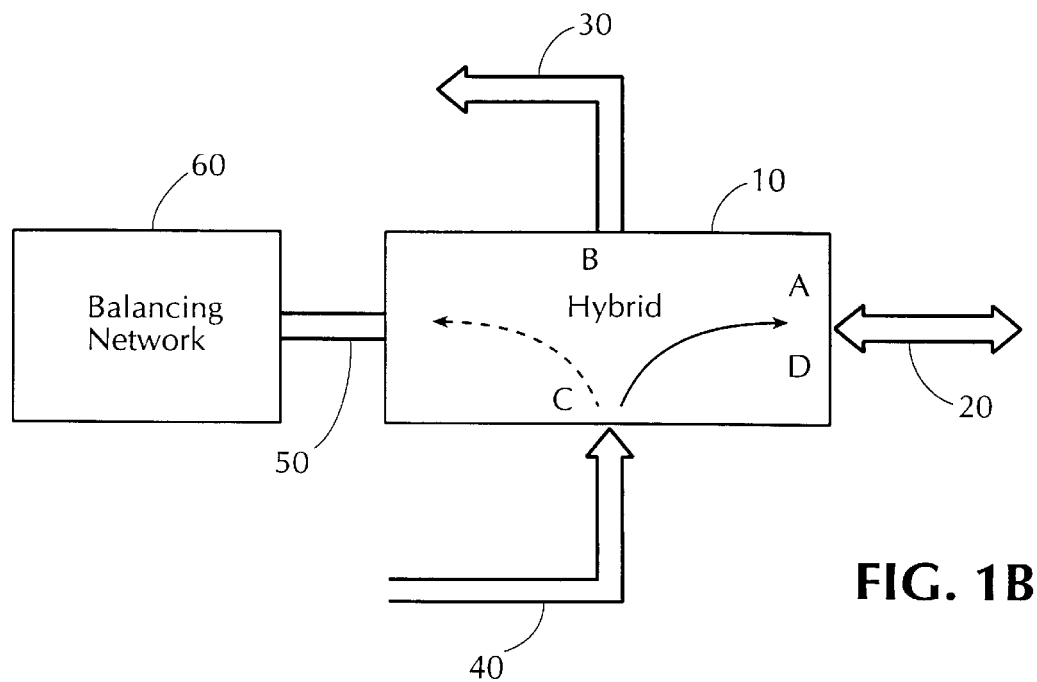

In telecommunications systems, a full-duplex to half-duplex conversion circuit, such as a hybrid, can be viewed as a power splitter with four sets of wire pair connections. Referring to FIGS. 1A and 1B, a hybrid 10 has two half-duplex ports B, C connected to a four wire loop, i.e., a path 30 for receiving from the full-duplex port A, D and a path 40 for transmitting to the full-duplex port. The hybrid 10 also has a full-duplex port A, D connected to the two-wire subscriber or local loop 20. A fourth wire pair 50 connects the hybrid 10 to a cable balance network 60, which is constructed and arranged in accordance with the invention and which electrically balances the hybrid 10 with the two wire connection 20 to the local loop over the frequency range of the hybrid 10.

With perfect or ideal balance, signal energy entering the hybrid 10 from the transmit side port 40 splits in half, with half of the signal energy going to the local loop connection 20 (right-hand arrow) in FIG. 1B and the other half of the signal energy being dissipated in the balance network 60 (left-hand arrow) in FIG. 1B, and none of it going to port 30.

In the ideal case, the balancing network 60 balances the hybrid by displaying the same impedance as seen looking into the local loop connection 20 to the hybrid 10. In practice, the full-duplex port of the hybrid 10 connected to the local loop 20 looks into a large number of subscriber loop connections of different lengths and circuit conditions. Thus, a significant parameter in practice is the trans-hybrid loss, which depends upon the return loss, and which is a measure of the impedance mismatch between the impedance of the balance network 60 and the impedance connected to the full-duplex port A, D.

Figure 2:
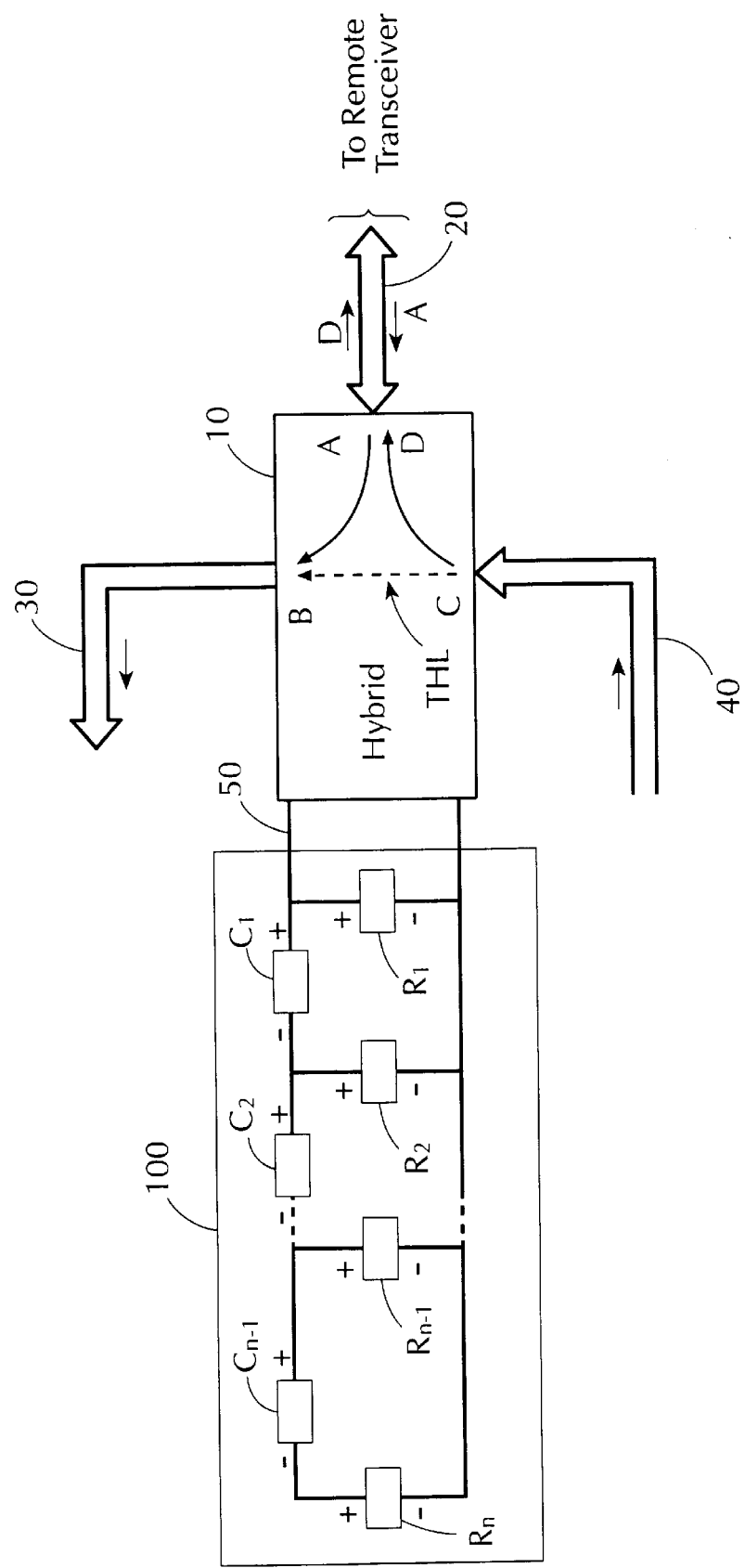
FIG. 2 is a first preferred embodiment of the cable balance network according to the present invention.

FIG. 2 depicts a first embodiment of a cable balance network designed and constructed and arranged in accordance with the present invention. As shown in FIG. 2, the cable balance network 100 of the present invention is constructed and arranged for use in a full-duplex telecommunication system. With reference to FIG. 2, a signal from the remote end is received on half-duplex port 30. A signal going to the remote end is placed on half-duplex port 40.

The cable balance network 100 of FIG. 2 comprises: a first plurality (n) of resistors $R_1, R_2, R_3, \ldots, R_n$. Each of the resistors has a fixed resistance value depending upon the local loop impedance connected to the full-duplex port . Each of the resistors has a positive node (+) and a negative node (-). The network 100 further comprises a second plurality (n-1) of capacitors $C_1, C_2, C_3, \ldots, C_{n-1}$. Each of the capacitors has a fixed capacitance value, which also depends upon the local loop impedance connected to the full-duplex port Each of the capacitors also has a positive node (+) and a negative node (-).

In accordance with the invention, an R-C circuit configuration for the balance network comprises at least two of the resistors $R_n$ and at least one of the capacitors $C_{n-1}$ arranged, such that all the negative nodes of each of the resistors are effectively connected together and such that the capacitor $C_{n-1}$ is connected between the positive nodes of resistors $R_n$ and $R_{n-1}$. In the circuit configuration so constructed and arranged, the resistance values and capacitance values define the cable balance network input impedance and an optimized transhybrid loss for the hybrid 10. In accordance with the invention, better input impedance approximations and higher transhybrid loss are realized by increasing the value of n, thereby providing a larger number of resistors $R_n$ and capacitors $C_{n-1}$ in the cable balance network. It is to be noted that an R-C circuit of this configuration has been used to stabilize a conventional control system while leaving as much phase margin as possible; see Perkins, P., "*Analog Circuit Design, Art Science and Personalities,*" ch.22, pp. 211–212 (Butterworth-Heinemann 1991).

Referring to FIG. 2, in accordance with another aspect of the present invention, the resistance value of resistor $R_1$ is preselected as a value equal to the local loop impedance at DC, connected to the full-duplex port, i.e., when the capacitors $C_{n-1}$ act as open circuits. The resistance values of the remaining resistors are selected such that the resistance of the parallel combination of resistors approximately equals the local loop impedance connected to the full-duplex port, at high frequencies, i.e., when the capacitors $C_{n-1}$ act as short circuits.

Figure 3:
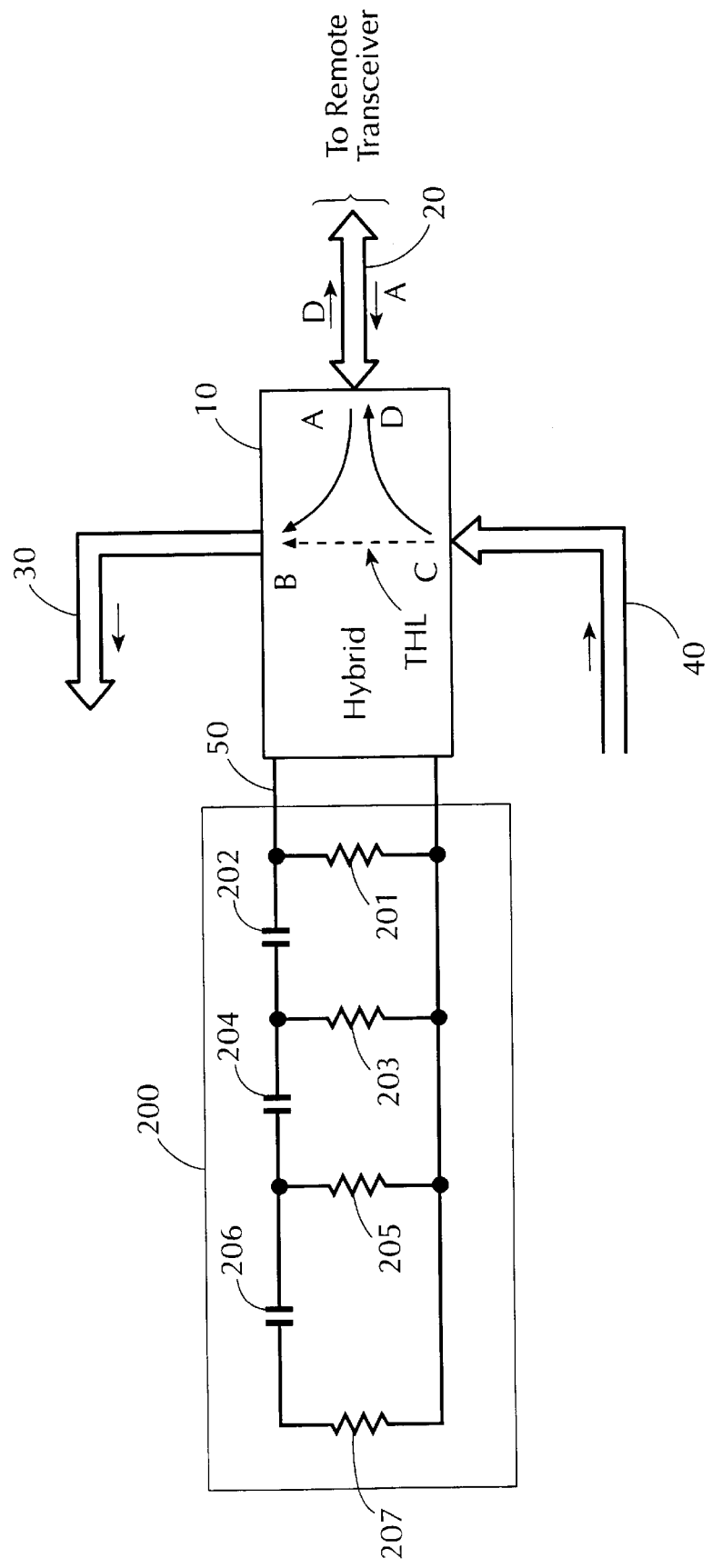
FIG. 3 is a second preferred embodiment of the cable balance network according to the present invention.

FIG. 3 depicts a second preferred embodiment of the cable balance network of the present invention. As with the first embodiment, the second preferred embodiment 200 is also constructed and arranged for use in a full-duplex telecommunication system and the first plurality n is selected to be four.

The network 200 of FIG. 3 comprises four resistors 201, 203, 205, 207, each having a fixed resistance value dependent upon the local loop impedance connected to the full-duplex port. Each resistor has a positive node (+) and a negative node (-). The network 200 further comprises three capacitors 202, 204, 206, each having a fixed capacitance value, which is also dependent upon the local loop impedance connected to the full-duplex port. Each capacitor has a positive node (+), and a negative node (-). The R-C configuration of network 200 comprises the resistors and the capacitors arranged and interconnected such that all the negative nodes of each of the resistors are effectively connected together and each of the capacitors is respectively connected between the positive nodes of adjacent pairs of resistors, i.e., capacitor 202 between the positive nodes of resistors 201, 203, capacitor 204 between the positive nodes of resistors 203, 205, and capacitor 206 between the positive nodes of resistors 205, 207. In accordance with the present invention, in the circuit configuration so constructed and arranged, the resistance values and capacitance values define the input impedance of the cable balance network 200 and provide an optimized transhybrid loss for the hybrid 10.

In accordance with another aspect of the present invention, the resistance value of resistor 201 is selected as a value equal to the local loop impedance at DC, connected to the full-duplex port, i.e., when capacitors 202, 204, 206 act as open circuits. The resistance values of the remaining resistors are selected such that the resistance of the parallel combination of all of the resistors equals the local loop impedance at high frequencies, connected to the full-duplex port, i.e., when capacitors 202,204,206 act as short circuits.

Figure 4:
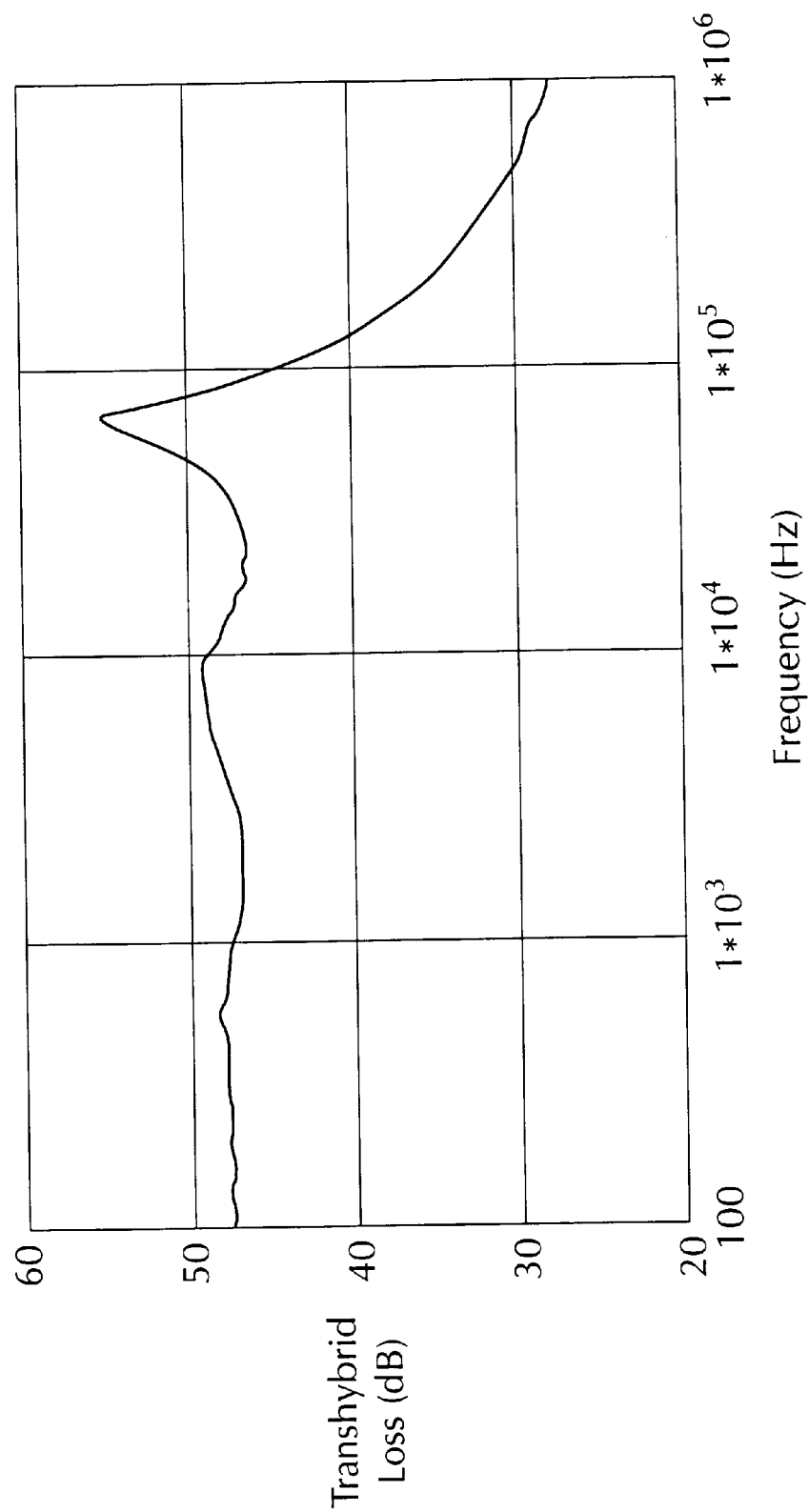
FIG. 4 is the transhybrid loss for a conversion circuit to which the cable balance network of the present invention is connected and is optimized for use with a 25 kft of 26 AWG PIC at 70° F. terminated in 135 ohms.

Table 1 shows the optimal resistance and capacitance values for the cable balance network 200 depicted in FIG. 3, for use with cables ranging in length from 10 kft to 30 kft. Each of the networks 200 are so constructed and arranged as to provide a transhybrid loss for the hybrid exceeding 40 dB in the frequency range from 100 Hz to about 100 kHz. The data of Table 1 reveal that, in general, the shorter the cable the better the transhybrid loss of the hybrid 10 . For example, the network 200 for use with a 10 kft. cable provides a transhybrid loss greater than 53 dB from 100 Hz through about 100 kHz. Additionally, FIG. 4 depicts the transhybrid loss for a hybrid with a cable balance network 200 connected thereto and optimized in accordance with the present invention, for use with 25 kft of 26 AWG polyethylene insulated cable ("AWGPIC") at 70° F. terminated in 135 ohms.

TABLE 1

Component Values for Various 26 AWG Cable Balance Networks Per FIG. 3.

| Cable | R1 | R2 | R3 | R4 | C1 | C2 | C3 |
|---|---|---|---|---|---|---|---|
| 30 kft 26 AWG PIC at 70° F. terminated in 135 ohms | 2609 ohms | 495.4 ohms | 256.6 ohms | 327.7 ohms | 160 nF | 54.0 nF | 11.9 nF |
| 25 kft 26 AWG PIC at 70° F. terminated in 135 ohms | 2240 ohms | 448 ohms | 260 ohms | 361 ohms | 140 nF | 49.5 nF | 11.3 nF |
| 20 kft 26 AWG PIC at 70° F. terminated in 135 ohms | 1817 ohms | 384 ohms | 271 ohms | 405 ohms | 114 nF | 43.4 nF | 10.2 nF |
| 15 kft 26 AWG PIC at 70° F. terminated in 135 ohms | 1396 ohms | 301 ohms | 292 ohms | 532 ohms | 86.9 nF | 31.9 nF | 8.14 nF |
| 10 kft 26 AWG PIC at 70° F. terminated in 135 ohms | 974 ohms | 217 ohms | 343 ohms | 1180 ohms | 59.4 nF | 16.0 nF | 4.12 nF |

Figure 5:
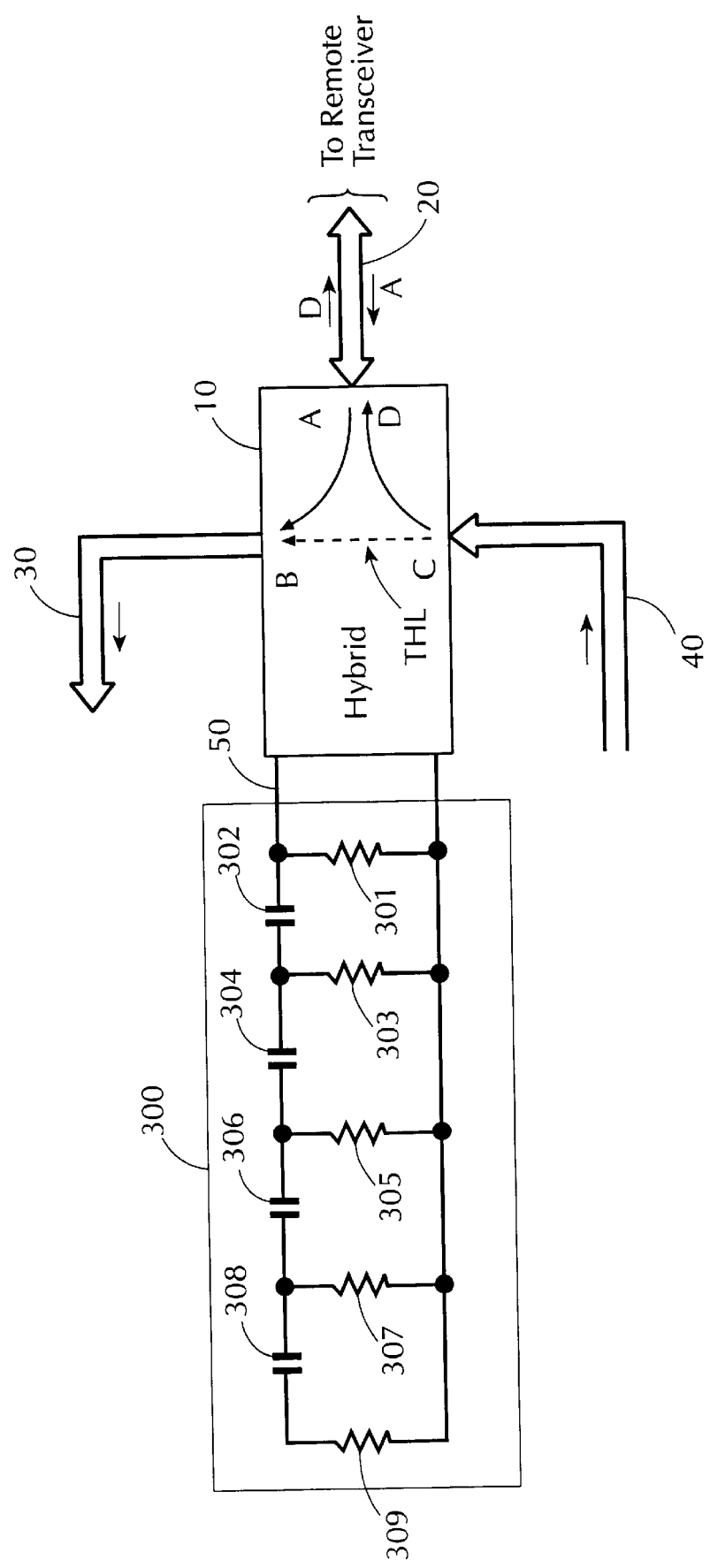
FIG. 5 is a third preferred embodiment of the cable balance network according to the present invention.

FIG. 5 depicts a third preferred embodiment of the cable balance network of the present invention, in which the selected first plurality n equals five. The third embodiment 300 of the present invention depicted in FIG. 5 is also constructed and arranged for use in a full-duplex telecommunication system.

Referring to FIG. 5, the network 300 comprises five resistors 301, 303, 305, 306, 307 and four capacitors 302, 304, 306, 308. Each of the resistors has a fixed resistance value dependent upon the local loop impedance connected to the full-duplex port. Each resistor has a positive node (+) and a negative node (-). Each of the capacitors has a fixed capacitance value dependent upon the local loop impedance connected to the full-duplex port and a positive node (+) and a negative node (-). The R-C configuration of network 300 comprises the resistors and the capacitors arranged and interconnected such that all the negative nodes of each of the resistors are effectively connected together and that each of the capacitors is respectively connected between the positive nodes of an adjacent pair of resistors e.g., capacitor 302 between the positive nodes of resistors 301, 303, capacitor 304 between the positive nodes of resistors 303, 305, capacitor 306 between the positive nodes of resistors 305, 307, and capacitor 308 between the positive nodes of resistors 307, 309. In accordance with the present invention, in the circuit configuration so constructed and arranged, the resistance values and capacitance values define the input impedance of the network 300 and provide an optimized transhybrid loss for the hybrid 10.

In accordance with another aspect of the present invention, the resistance value of resistor 301 is selected as a value equal to the local loop impedance at DC, connected to the full-duplex port, i.e., when the capacitors act as open circuits. The resistance values of the remaining resistors are selected such that the resistance of the parallel combination of resistors approximately equals the local loop impedance at high frequencies, connected to the full-duplex port i.e., when the capacitors act as short circuits.

Table 2 shows the optimal resistance and capacitance values for the cable balance network 300 depicted in FIG. 5. The values shown in Table 2 are optimized for 10 kft of 26 AWG PIC at cable 70° F. terminated in 135 ohms. The cable balance network 300 of FIG. 5 optimized with the values shown in Table 2 provides a transhybrid loss in hybrid 10 in excess of 52 dB in the frequency range from 100 Hz to about one MHZ (a slight degradation to 49 dB was observed centered around 200 kHz, while the transhybrid loss at some frequencies in the stated band was observed as in excess of 60 dB).

TABLE 2

Component Values for a 10 kft 26 AWG Cable Balance Network

| Cable | R1 | R2 | R3 | R4 | R5 | C1 | C2 | C3 | C4 |
|---|---|---|---|---|---|---|---|---|---|
| 10 kft 26 AWG PIC at 70° F. terminated in 135 ohms | 965.2 ohms | 207.0 ohms | 292.8 ohms | 1288 ohms | 2210 ohms | 58.16 nF | 12.81 nF | 0.307 nF | 79.02 nF |

Another aspect of the present invention is a method for selecting the resistance and capacitance values of the cable balance networks shown in FIGS. 2, 3 and 5. The method optimizes the input impedance match of the cable balance network and local loop and also optimize the transhybrid loss of the hybrid. The method has the significant advantage of broad application to impedance matching of electrical circuits in general. In the specific application to the design of an R-C cable balance network, the method comprises the steps of: (a) characterizing the impedance of a subscriber loop connected to the full-duplex port over a preselected frequency range; (b) selecting a resistance value of an input resistor $R_1$ of a first plurality n of resistors in the network to be equal to the local loop impedance at DC connected to the full-duplex port; (c) selecting the resistance values of the remaining (n−1) resistors such that the resistance of the parallel combination of all of the resistors equals the local loop impedance at high frequencies, connected to the full-duplex port; and (d) optimizing the resistance and capacitance values to optimize the transhybrid loss of the hybrid.

As an illustrative example, the purpose of the first step of the disclosed method is to generate an accurate table of the local loop impedance connected to the full-duplex port versus frequency, when terminated in the local loop's characteristic impedance, i.e., typically 135 ohms resistive. This can be done advantageously using the Mathcad® program (version 6.0) applying ABCD parameters in the calculations (see "Transmission Systems for Communications," ch. 10, pp. 228–233 (Bell Laboratories 1982)) together with a table lookup derived from the Bellcore R-L-G-C tables, and using linear interpolation for in-between frequencies. See Mathcad® file PROTOGEN.MCD provided in Appendix A. By way of example and not limitation, the impedance is calculated at 24 points per decade of frequency.

The resulting table containing the local loop input impedance data is then used to calculate the impedance of the cable balance network and the corresponding transhybrid loss of the hybrid in dB at a number of frequencies. See Mathcad® file PROTOM2.MCD provided in Appendix A. These points are then used as the optimization criteria for application in the Mathcad® "minerr" optimization function routine.

Significant to the calculation of an optimized solution are (1) choosing the initial starting point; (2) choosing the range and number of frequencies for optimization; and (3) deciding how much transhybrid loss to realize.

Referring to FIGS. 2, 3 or 5, the resistance value of resistor $R_1$ is first selected to be equal to the DC resistance of the loop plus its termination as seen by the full-duplex port. The resistance of the parallel combination of all the resistors in the network is then selected to the equal to the impedance of the local loop plus its termination at high frequencies as seen by the full-duplex port. Choosing the values of the resistors other than R, and the capacitors is done by plotting both impedance functions and adjusting the resistance and capacitance values until the desired transhybrid loss is achieved. The Mathcad® "minerr" function is used to improve the optimization of the transhybrid loss.

The Mathcad® "minerr" function requires that at least N optimization points be specified, where N is the number of variables being optimized. More than N points can be chosen, but care must be exercised as to avoid defining a system with no solution. The frequency range picked must also be considered. The wider the frequency range, the less the amount of transhybrid loss that can be achieved. Moreover, the transhybrid loss criteria can be relaxed at frequencies below the hybrid's cut-off frequency.

The optimization routine "minerr" is run using a target transhybrid loss of 40 dB or less. If the routine reports no solution for the circuit being simulated, a target transhybrid loss of 35 dB or less is used. When a solution is realized, a higher target transhybrid loss can be realized by using different initial resistance and capacitance values. Proceeding iteratively in this way can afford significant improvement.

Uneven transhybrid loss curves over a desired frequency range usually indicate that the resistance and capacitance values can still be adjusted for higher overall transhybrid loss. Additionally, one or two resistance and/or capacitance values can be drastically adjusted to force a different starting point and to determine whether the "minerr" optimization function converges on a better solution.

If a reasonable solution is realized for a 20 kft long cable, for example, and what is desired is a solution for a 25 kft long cable, the 20 kft cable solution can be used advantageously as a starting point for the 25 kft long cable case. In either case, the DC value of local loop resistance plus its termination resistance is the resistance value selected for $R_1$.

As an illustrative example, the above-mentioned method was used to find a balance network model for 10 kft of 26 AWG cable for frequencies up to 1 MHZ. The values shown below in Table 3 exhibit transhybrid loss in the hybrid of 49 dB over most of the band, dropping to 46 dB at 1 MHZ. The component values in Tables 1 and 2 were derived using the same method herein described.

TABLE 3

Component Values for a 10 kft 26 AWG Cable Balance Network Determined by Using Method for Optimizing Transhybrid Loss

| Cable | R1 | R2 | R3 | R4 | C1 | C2 | C3 |
|---|---|---|---|---|---|---|---|
| 10 kft 26 AWG PIC at 70° F. terminated in 135 ohms | 963 ohms | 207.7 ohms | 289.3 ohms | 1097 ohms | 58.1 nF | 13.05 nF | 0.241 nF |

Thus, I have described a novel cable R-C balance network, and a novel method for selecting the components thereof and also for optimizing transhybrid loss, as well as a novel method for impedance matching and circuit synthesis.

Although the present invention has been described in connection with particular embodiments thereof, it is to be understood that additional embodiments, modifications, and applications thereof, which will be obvious to those skilled in the art are included within the spirit and scope of the present invention. Although the descriptions, for the sake of clarity, have centered around classical realization of a hybrid, the invention is applicable in other 2W–4W or echo cancelling structures. Scaled versions of the cable impedance simulating network may be advantageously used in classical hybrids, or in cancellers where an approach more easily described by matched transfer functions is taken.

In those applications, the cable impedance simulating network, or an impedance scaled variation thereof, can be used to duplicate the transfer function from the local transmitter to the receive port, and then cancel that signal by an appropriately scaled subtraction.

Appropriate simplified transfer functions can be derived by using the simple impedance model based on this invention, facilitating the construction of canceller based approaches which do not explicitly contain the RC network described in this invention.

While I have disclosed particular embodiments of the present invention, variations in procedural and structural detail within the scope of the appended claims and which are within the skill of those of ordinary skill in the telecommunicationsart to provide, are possible, and I contemplate them. I have no intention to limit the scope of the appended claims to the abstract or to the exact disclosure herein presented.

A31054 - 072668.0104

APPENDIX A

A31054 - 072668.0104

PROTOGEN.MCD and PROTOM2.MCD Files

© This is an unpublished work in which copyright subsists and is owned by Adtran, Inc. All rights reserved.

CT = READPRN(C70C26)  C70C26 is part of filename C70C26.PRN of a cable table consisting of F,R,L,G,C per mile based on 26 AWG PIC cable at 70 F. ANSI T1.601-1992 cable tables located in this directory.

$k = 0, 1 .. 96$  $j := \sqrt{-1}$  filename is protogen.mcd. adds impedance calculation $f_k = 100 \cdot 10^{\frac{k}{24}}$  all lengths in miles $w = f \cdot 2 \cdot \pi$ $a(R,L,G,C,w,m) := \cosh\left[\sqrt{(R+j \cdot w \cdot L) \cdot (G+j \cdot w \cdot C)} \cdot m\right]$ $b(R,L,G,C,w,m) := \sqrt{\frac{R+j \cdot w \cdot L}{G+j \cdot w \cdot C}} \cdot \sinh\left[\sqrt{(R+j \cdot w \cdot L) \cdot (G+j \cdot w \cdot C)} \cdot m\right]$ $c(R,L,G,C,w,m) := \sqrt{\frac{G+j \cdot w \cdot C}{R+j \cdot w \cdot L}} \cdot \sinh\left[\sqrt{(R+j \cdot w \cdot L) \cdot (G+j \cdot w \cdot C)} \cdot m\right]$ $d(R,L,G,C,w,m) := \cosh\left[\sqrt{(R+j \cdot w \cdot L) \cdot (G+j \cdot w \cdot C)} \cdot m\right]$ $p_k := \sum_N (f_k \geq CT_{N,0}) \cdot (f_k < CT_{N+1,0}) \cdot N$ find proper line for interpolation in cable tables $R_k := CT_{p_k,1} + (f_k - CT_{p_k,0}) \cdot \frac{CT_{p_k+1,1} - CT_{p_k,1}}{CT_{p_k+1,0} - CT_{p_k,0}}$ $L_k := CT_{p_k,2} + (f_k - CT_{p_k,0}) \cdot \frac{CT_{p_k+1,2} - CT_{p_k,2}}{CT_{p_k+1,0} - CT_{p_k,0}}$  $f_{72} = 1 \cdot 10^5$ $G_k := CT_{p_k,3} + (f_k - CT_{p_k,0}) \cdot \frac{CT_{p_k+1,3} - CT_{p_k,3}}{CT_{p_k+1,0} - CT_{p_k,0}}$  $R_{72} = 463.39$ $G_{72} = 6.32 \cdot 10^{-6}$ $C_k := CT_{p_k,4} + (f_k - CT_{p_k,0}) \cdot \frac{CT_{p_k+1,4} - CT_{p_k,4}}{CT_{p_k+1,0} - CT_{p_k,0}}$  $L_{72} = 9.432 \cdot 10^{-4}$ $C_{72} = 8.3 \cdot 10^{-8}$ $AM(k,m) := a(R_k, L_k, G_k, C_k, w_k, m)$  $BM(k,m) := b(R_k, L_k, G_k, C_k, w_k, m)$ $CM(k,m) := c(R_k, L_k, G_k, C_k, w_k, m)$  $DM(k,m) := d(R_k, L_k, G_k, C_k, w_k, m)$ $BT(k,m) := \begin{pmatrix} 1 & 0 \\ \frac{CM(k,m)}{AM(k,m)} & 1 \end{pmatrix}$  $Zt := 135$  $Zs := 135$  $CA(k,m) := \begin{pmatrix} AM(k,m) & BM(k,m) \\ CM(k,m) & DM(k,m) \end{pmatrix}$ No bridge tap. 30 kft of cable $Rm(k) := CA\left(k, \frac{30}{5.28}\right) \cdot BT\left(k, \frac{0}{5.28}\right)$ $ILdb(k) := 20 \cdot \log\left[\left|\frac{Rm(k)_{0,0} \cdot Zt + Rm(k)_{0,1} + (Rm(k)_{1,0} \cdot Zt + Rm(k)_{1,1}) \cdot Zs}{Zs + Zt}\right|\right]$ $Zcable(k) := \frac{Rm(k)_{0,0} \cdot Zt + Rm(k)_{0,1}}{Rm(k)_{1,0} \cdot Zt + Rm(k)_{1,1}}$  $Zmag(k) := \left|\frac{Rm(k)_{0,0} \cdot Zt + Rm(k)_{0,1}}{Rm(k)_{1,0} \cdot Zt + Rm(k)_{1,1}}\right|$ © This is an unpublished work in which copyright subsists and is owned by Adtran, Inc. All rights reserved.

$$dat_{k,0} = f_k$$
$$dat_{k,1} = Zcable(k)$$

$$WRITEPRN(z30x26) = dat$$

PROTOM2.MCD 1 12/4/96 09:26 AM

Prototype for Cable Matching Networks

$a := \text{READPRN}(z10x26)$    $k := 0,1..\text{rows}(a) - 1$    Impedance data generated by protogen.mcd $f_k := a_{k,0}$    $z_k := a_{k,1}$    $z_0 = 968.2 - 34.63i$ $$Z(s,R1,R2,R3,R4,C1,C2,C3) := \frac{\left[R2 + \frac{\left[\frac{\left(R4 + \frac{1}{s \cdot C3}\right) \cdot R3}{R3 + R4 + \frac{1}{s \cdot C3}} + \frac{1}{s \cdot C2}\right] \cdot R2}{R3 + R4 + \frac{1}{s \cdot C3}} + \frac{1}{s \cdot C1}\right] \cdot R1}{R1 + \left[R2 + \frac{\left[\frac{\left(R4 + \frac{1}{s \cdot C3}\right) \cdot R3}{R3 + R4 + \frac{1}{s \cdot C3}} + \frac{1}{s \cdot C2}\right] \cdot R2}{R3 + R4 + \frac{1}{s \cdot C3}} + \frac{1}{s \cdot C1}\right]}$$

$(R1\ R2\ R3\ R4\ C1\ C2\ C3) := (10 \cdot 83 + 135\ 292\ 271\ 532\ 87 \cdot 10^{-9}\ 32.5 \cdot 10^{-9}\ 8.3 \cdot 10^{-9})$ $Zn(s) := Z(s,R1,R2,R3,R4,C1,C2,C3)$ $RL(k,R1,R2,R3,R4,C1,C2,C3) := 20 \cdot \log\left(\left|\frac{Z\left(2 \cdot \pi \cdot f_k \cdot \sqrt{-1}, R1, R2, R3, R4, C1, C2, C3\right) + z_k}{Z\left(2 \cdot \pi \cdot f_k \cdot \sqrt{-1}, R1, R2, R3, R4, C1, C2, C3\right) - z_k}\right|\right)$ $p := 53$ Given RL(0,R1,R2,R3,R4,C1,C2,C3)>p    RL(50,R1,R2,R3,R4,C1,C2,C3)>p
RL(10,R1,R2,R3,R4,C1,C2,C3)>p   RL(60,R1,R2,R3,R4,C1,C2,C3)>p
RL(20,R1,R2,R3,R4,C1,C2,C3)>p   RL(70,R1,R2,R3,R4,C1,C2,C3)>p
RL(30,R1,R2,R3,R4,C1,C2,C3)>p
RL(40,R1,R2,R3,R4,C1,C2,C3)>p

-26-

© This is an unpublished work in which copyright subsists and is owned by Adtran, Inc. All rights reserved.

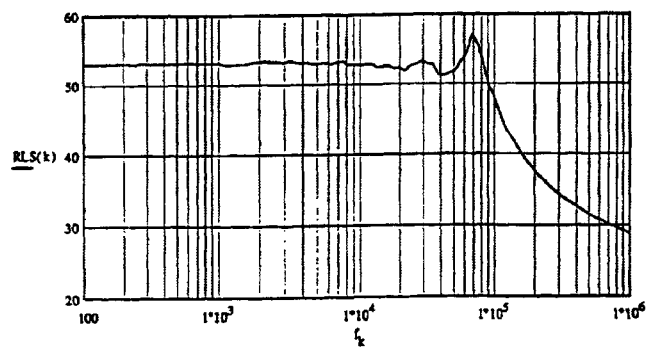

I claim:

1. A cable balance network for echo-cancelling in a full-duplex telecommunication system incorporating a full-duplex port, at least one half-duplex port, and a full-duplex to half-duplex conversion circuit, said cable balance network comprising:
   (a) a first plurality n of resistors $R_n$, each of said resistors $R_n$ having a fixed resistance value dependent upon the impedance connected to said full-duplex port, and each of said resistors $R_n$, having a positive node and a negative node;
   (b) a second plurality n–1 of capacitors $C_{n-1}$, each of said capacitors $C_{n-1}$ having a fixed capacitance value dependent upon the impedance connected to said full-duplex port, and each of said capacitors $C_{n-1}$ having a positive and a negative node; and
   (c) a circuit configuration comprising at least one pair of said first plurality of resistors and at least one of said second plurality of capacitors, such that the negative nodes of each of said resistors are effectively connected together, and such that each of said capacitors is connected between the positive nodes of a respective pair of said resistors; the circuit configuration being so constructed and arranged that said resistance values and capacitance values define an optimized cable balance network input impedance and an optimized transhybrid loss for said conversion circuit.

2. A cable balance network for a full-duplex telecommunication system incorporating a full duplex port, at least one half-duplex port, and a full-duplex to half-duplex hybrid coupling circuit, said cable balance network comprising:
   (a) a first plurality n of resistors $R_n$, each of said resistors $R_n$ having a fixed resistance value dependent upon the impedance connected to said full-duplex port, and each of said resistors $R_n$ having a positive node and a negative node;
   (b) a second plurality n–1 of capacitors $C_{n-1}$, each of said capacitors $C_{n-1}$ having a fixed capacitance value dependent upon the impedance connected to said full-duplex port, and each of said capacitors $C_{n-1}$ having a positive and a negative node; and
   (c) a circuit configuration comprising at least one pair of said first plurality of resistors and at least one of said second plurality of capacitors, such that the negative nodes of each of said resistors are effectively connected together, and such that each of said capacitors is connected between the positive nodes of a respective pair of said resistors; the circuit configuration being so constructed and arranged that said resistance values and capacitance values define an optimized cable balance network input impedance and an optimized transhybrid loss for said hybrid.

3. The cable balance network of claim 2, wherein the resistance value of said resistor $R_1$ equals the impedance connected to said full-duplex port at DC.

4. The cable balance network of claim 2, wherein the resistance value of the parallel combination of said resistors $R_1$ through $R_n$ equals the impedance connected to said full-duplex port at high frequencies.

5. The cable balance network of claim 2, wherein the resistance values of said resistors $R_n$ and the capacitance values of said capacitors $C_{n-1}$ are variable dependent upon the impedance connected to said full-duplex port.

6. The cable balance network of claim 2, wherein the resistance values of said resistors $R_n$ and the capacitance values of said capacitors $C_{n-1}$ are adaptable dependent upon the impedance connected to said full-duplex port.

7. The cable balance network of claim 2, wherein the impedance of said circuit configuration and said plurality of resistors $R_n$ and plurality of capacitors $C_{n-1}$ are implemented by discrete components.

8. The cable balance network of claim 2, wherein the impedance of said circuit configuration and said plurality of resistors $R_n$ and plurality of capacitors $C_{n-1}$ are implemented by an integrated circuit.

9. A cable balance network for echo-cancelling in a full-duplex telecommunication system characterized by a full-duplex port, at least one half-duplex port, and a full-duplex to half-duplex conversion circuit, said cable balance network comprising:
   (a) four resistors $R_1$, $R_2$, $R_3$, and $R_4$, each of said resistors $R_1$, $R_2$, $R_3$, and $R_4$ having a fixed resistance value dependent upon the impedance connected to said full-duplex port, and each of said resistors $R_1$, $R_2$, $R_3$, and $R_4$ having a positive node and a negative node;
   (b) three capacitors $C_1$, $C_2$, and $C_3$, each of said capacitors $C_1$, $C_2$, and $C_3$ having a fixed capacitance value dependent upon the impedance connected to said full-duplex port, and each of said capacitors $C_1$, $C_2$, and $C_3$ having a positive node and a negative node; and
   (c) a circuit configuration comprising said resistors $R_1$, $R_2$, $R_3$, and $R_4$, and said capacitors $C_1$, $C_2$, and $C_3$, such that all the negative nodes of each of said resistors are effectively connected together, and such that the capacitor $C_1$ is connected between the positive nodes of resistors $R_1$ and $R_2$, the capacitor $C_2$ is connected between the positive nodes of resistors $R_2$ and $R_3$, and the capacitor $C_3$ is connected between the positive nodes of resistors $R_3$ and $R_4$; the circuit configuration being so constructed and arranged that said resistance values and capacitance values define an optimized cable balance network input impedance and an optimized transhybrid loss for said conversion circuit.

10. The cable balance network of claim 9, wherein the resistance value of said resistor $R_1$ equals the impedance connected to said full-duplex port at DC.

11. The cable balance network of claim 9, wherein the resistance value of the parallel combination of said resistors $R_1$, $R_2$, $R_3$, and $R_4$ equals the impedance connected to said full-duplex port at high frequencies.

12. The cable balance network of claim 9, wherein the resistance values of said resistors $R_1$, $R_2$, $R_3$, and $R_4$ and the capacitance values of said capacitors $C_1$, $C_2$ and $C_3$ are variable dependent on the impedance connected to said full-duplex port.

13. The cable balance network of claim 9, wherein the resistance values of said resistors $R_1$, $R_2$, $R_3$, and $R_4$ and the capacitance values of said capacitors $C_1$, $C_2$ and $C_3$ are adaptable dependent on the impedance connected to said full-duplex port.

14. The cable balance network of claim 9, wherein the impedance of said circuit configuration and said resistors $R_1$, $R_2$, $R_3$, and $R_4$ and capacitors $C_1$, $C_2$ and $C_3$ are implemented by discrete components.

15. The cable balance network of claim 9, wherein the impedance of said circuit configuration and said resistors $R_1$, $R_2$, $R_3$, and $R_4$ and capacitors $C_1$, $C_2$ and $C_3$ are implemented via an integrated circuit.

16. A cable balance network for echo-cancelling in a full-duplex telecommunication system characterized by a full-duplex port, at least one-half-duplex port, and a full-duplex to half-duplex conversion circuit, said cable balance network comprising:
   (a) five resistors $R_1$, $R_2$, $R_3$, $R_4$, and $R_5$ each of said resistors $R_1$, $R_2$, $R_3$, $R_4$, and $R_5$ having a fixed resistance value dependent upon the impedance connected to said full-duplex port, and each of said resistors $R_1$, $R_2$, $R_3$, $R_4$, and $R_5$ having a positive node and a negative node;

(b) four capacitors $C_1$, $C_2$, $C_3$, and $C_4$ each of said capacitors $C_1$, $C_2$, $C_3$, and $C_4$ having a fixed capacitance value dependent upon the impedance connected to said full-duplex port, and each of said capacitors $C_1$, $C_2$, $C_3$, and $C_4$ having a positive node and a negative node; and (c) a circuit configuration comprising said resistors $R_1$, $R_2$, $R_3$, $R_4$, and $R_5$, and said capacitors $C_1$, $C_2$, $C_3$, and $C_4$, such that all the negative nodes of each of said resistors are effectively connected together, and such that the capacitor $C_1$ is connected between the positive nodes of resistors $R_1$ and $R_2$, the capacitor $C_2$ is connected between the positive nodes of resistors $R_2$ and $R_3$, and the capacitor $C_3$ is connected between the positive nodes of resistors $R_3$ and $R_4$, and the capacitor $C_4$ is connected between the positive nodes of resistors $R_4$ and $R_5$;

the circuit configuration being so constructed and arranged that said resistance values and capacitance values define an optimized cable balance network input impedance and an optimized transhybrid loss for said conversion circuit.

17. The cable balance of claim 16, wherein the resistance value of said resistor $R_1$ equals the impedance seen by said full-duplex port at DC.

18. The cable balance network of claim 16, wherein the resistance value of the parallel combination of said resistors $R_1$, $R_2$, $R_3$, $R_4$, and $R_5$ equals the impedance seen by said full-duplex port at high frequencies.

19. The cable balance network of claim 16, wherein the resistance values of said resistors $R_1$, $R_2$, $R_3$, $R_4$, and $R_5$ and the capacitance values of said capacitors $C_1$, $C_2$, $C_3$, and $C_4$ are variable dependent on the impedance seen by said full-duplex port.

20. The cable balance network of claim 16, wherein the resistance values of said resistors $R_1$, $R_2$, $R_3$, $R_4$, and $R_5$ and the capacitance values of said capacitors $C_1$, $C_2$, $C_3$, and $C_4$ are variable adaptable dependent on the impedance seen by said full-duplex port.

21. The cable balance network of claim 16, wherein the impedance of said circuit configuration and said resistors $R_1$, $R_2$, $R_3$, $R_4$, and $R_5$ and capacitors $C_1$, $C_2$, $C_3$, and $C_4$ are implemented by discrete components.

22. The cable balance network of claim 16, wherein the impedance of said circuit configuration and said resistors $R_1$, $R_2$, $R_3$, $R_4$, and $R_5$ and capacitors $c_1$, $C_2$, $C_3$, and $C_4$ are implemented via an integrated circuit.

23. In a method for designing a cable balance network for a full-duplex telecommunication system characterized by a full-duplex port, at least one half-duplex port, and a full-duplex to half-duplex conversion circuit, said cable balance network comprising a first plurality n of resistors $R_n$, each of said resistors $R_n$ having a positive node and a negative node; a second plurality n–1 of capacitors $C_{n-1}$ each of said capacitors $C_{n-1}$ having a positive node and a negative node; and an R-C circuit configuration comprising at least two of said resistors $R_n$ and $R_{n+1}$ and at least one of said capacitors $C_n$, such that the negative nodes of each of said resistors are effectively connected together and such that the capacitor is connected between the positive nodes of said resistors; a method for selecting resistance and capacitance values for each of said resistors $R_n$ and capacitors $C_n$ so as to optimize the input impedance match of said network to the to the impedance as seen by said full-duplex port and so as to optimize the transhybrid loss of said circuit, said method comprising the step of:

(a) characterizing the input impedance seen by said full-duplex port over a preselected frequency range;

(b) selecting a resistance value of resistor $R_1$ equal to the impedance seen by said full-duplex port at DC;

(c) selecting the resistance values of the remaining resistors such that the resistance of the parallel combination of said resistors $R_1$ through $R_n$ equals the impedance seen by said full-duplex port at high frequencies; and;

(d) optimizing said resistance and capacitance values to optimize said cable balance network input impedance and to optimize the transhybrid loss for said conversion circuit.

24. A cable balance network for echo-cancelling in a full-duplex telecommunication system, said cable balance network comprising:

a plurality of parallel resistors, each of said resistors having a positive node and a negative node; and a plurality of capacitors, each of said capacitors respectively having a positive node coupled to the positive node of one of said resistors and a negative node coupled to the positive node of another of said resistors, wherein said cable balance network is coupled to a hybrid and wherein said resistors and capacitors substantially match an impedance of a local loop coupled to said hybrid thereby balancing said hybrid.

25. The cable balance network of claim 24, wherein said cable network comprises an n number of said resistors and n–1 number of said capacitors.

26. The cable balance network of claim 24, wherein the positive node of a first one of said resistors is coupled to one of said capacitors, wherein the positive node of a second of said resistors is coupled to one of said capacitors, and wherein each of the positive nodes of each of said resistors between said first and second resistors is coupled to a plurality of said capacitors.

27. The cable balance network of claim 26, wherein a resistance of said first resistor is approximately equal to an impedance of said local loop when each of said capacitors corresponds to an open circuit.

28. The cable balance network of claim 26, wherein a total parallel resistance of said resistors approximately equals an impedance of said local loop when each of said capacitors corresponds to a short circuit.

29. A method for providing cable balance networks for echo-cancelling in full duplex telecommunication systems, comprising the steps of:

providing a cable balance network, said cable balance network having a plurality of parallel resistors and a plurality of capacitors, each of said resistors having a positive node and a negative node, each of said capacitors respectively having a positive node coupled to the positive node of one of said resistors and a negative node coupled to the positive node of another of said resistors;

coupling said balance network to a hybrid; and coupling said hybrid to a local loop.

30. The method of claim 29, further comprising the step of selecting a resistance for one of said resistors such that said resistance is approximately equal to an impedance of said local loop when each of said capacitors corresponds to an open circuit.

31. The method of claim 30, further comprising the step of selecting a resistance for each of said resistors such that a total parallel resistance of said resistors is approximately equal to an impedance of said local loop when each of said capacitors corresponds to a short circuit.

32. The cable balance network of claim 1, wherein said circuit configuration has no inductors.

33. The cable balance network of claim 2, wherein said circuit configuration has no inductors.

34. The cable balance network of claim 24, wherein said cable balance network has no inductors.

35. The method of claim 29, wherein said cable balance network has no inductors.

* * * * *